United States Patent [19]
Yagi et al.

[11] Patent Number: 5,405,302
[45] Date of Patent: Apr. 11, 1995

[54] SHIFTING CONTROL APPARATUS FOR AUTOMATIC TRANSMISSION OF AUTOMOTIVE VEHICLE

[75] Inventors: Yoshifumi Yagi, Okazaki; Hirohito Nishikata, Susono, both of Japan

[73] Assignee: Toyota Jidosha Kabushiki Kaisha, Toyota, Japan

[21] Appl. No.: 32,899

[22] Filed: Mar. 18, 1993

[30] Foreign Application Priority Data

Mar. 23, 1992 [JP] Japan .................... 4-065082

[51] Int. Cl.⁶ .............................................. F16H 59/24
[52] U.S. Cl. ................................. 477/107; 477/110
[58] Field of Search ..................... 74/866; 364/424.1

[56] References Cited

U.S. PATENT DOCUMENTS

| | | | |
|---|---|---|---|
| 3,684,066 | 8/1972 | Kubo et al. | 74/866 X |
| 3,747,438 | 7/1973 | Toyoda et al. | 74/866 OR |
| 4,753,133 | 6/1988 | Itoh et al. | 74/866 OR |
| 4,919,012 | 4/1990 | Bolz | 74/866 OR |

FOREIGN PATENT DOCUMENTS

| | | |
|---|---|---|
| 393669 | 10/1990 | European Pat. Off. . |
| 425275 | 5/1991 | European Pat. Off. . |
| 3711913 | 10/1988 | Germany . |
| 4127149 | 2/1992 | Germany . |
| 218932 | 9/1989 | Japan . |

*Primary Examiner*—Dirk Wright
*Attorney, Agent, or Firm*—Kenyon & Kenyon

[57] ABSTRACT

A shifting control apparatus for an automatic transmission of an automotive vehicle includes a throttle valve part, a traction control part for carrying out a traction control process for adjusting the throttle valve part to reach a first throttle position value when the vehicle is operating under prescribed operating conditions, the first throttle position value being smaller than a second throttle position value corresponding to a displacement of an accelerator pedal set by a vehicle operator, a throttle position setting part for setting a mean throttle position value by taking a weighted average of the first throttle position value set while the traction control process is being carried out and the second throttle position value corresponding to the displacement of the accelerator pedal, and a control part for carrying out a shifting control process for the automatic transmission in accordance with the mean throttle position value from the throttle position setting part.

7 Claims, 6 Drawing Sheets

SHIFTING CONTROL APPARATUS FOR AUTOMATIC TRANSMISSION OF AUTOMOTIVE VEHICLE

BACKGROUND OF THE INVENTION (1) Field of the Invention

The present invention generally relates to shifting control apparatus for automatic transmissions of automotive vehicles, and more particularly to a shifting control apparatus for controlling an automatic transmission of an automotive vehicle in which a traction control process is performed so as to prevent the driving wheels of the vehicle from undergoing excessive slippage when the vehicle starts moving or when it is accelerated.

(2) Description of the Related Art

Traction control devices for use in automotive vehicles equipped with automatic transmissions are known. In an automotive vehicle equipped with an automatic transmission, a known traction control process is performed by the traction control device to prevent the driving wheels of the vehicle from undergoing excessive slippage when the vehicle starts moving or when it is accelerated. By performing the traction control process by means of the traction control device, vehicle acceleration and straight line stability are improved when the vehicle is in such operating conditions.

In the above mentioned traction control device, a target rotational speed is predetermined for each of the driving wheels of the vehicle. The slipping amount is defined to be the speed difference between the predetermined target rotational speed and the actual rotational speed of the driving wheels of the vehicle. In the above mentioned traction control device, a feedback control process for the drive torque is performed so as to maintain the slipping amount at a value smaller than a predetermined speed difference value. Hereinafter, the feedback control process for maintaining the slipping amount at a value smaller than a predetermined speed difference value is called the traction control process.

In order to control the drive torque in the feedback control process, the traction control device includes a main throttle valve and a sub-throttle valve provided in the intake passage of the engine. The throttle position of the main throttle valve is adjusted (opened or closed) in accordance with the position of an accelerator pedal set by a vehicle operator. The throttle position of the sub-throttle valve is adjusted by an actuator such as a stepper motor. When slippage occurs in the vehicle, the throttle position of the sub-throttle valve is adjusted by the actuator to reach a smaller throttle position (or, a more closed position) so that the drive torque is reduced. This operation performed by the traction control device is hereinafter called a closing control. Hereinafter, a throttle position of the throttle valve is defined to be the degree to which the throttle valve is open.

Japanese Laid-Open Patent Publication No. 1-218932 discloses a shifting control device for controlling the automatic transmission of the vehicle including the above described traction control device. In the shifting control device disclosed in this publication, a shifting control process for the automatic transmission when the traction control process is not being performed is carried out in accordance with the main throttle position indicated by an output signal of a throttle position sensor provided at the main throttle valve, and in accordance with the vehicle speed indicated by an output signal of a vehicle speed sensor, so that the shifting of the automatic transmission is performed so as to become appropriate for the operating conditions of the vehicle.

In the shifting control device mentioned above, the shifting control process for the automatic transmission when the traction control process is being performed is carried out in accordance with a derived throttle position and the vehicle speed. This throttle position is derived from the estimated air amount Q/N calculated from the intake air amount Q and the engine speed N. The vehicle speed is indicated by an output signal of the vehicle speed sensor. The shifting control process for the automatic transmission is performed substantially in accordance with the throttle position of the sub-throttle valve.

Thus, in the case of the conventional device mentioned above, since the shifting control process is performed in accordance with the throttle position of the sub-throttle valve, it is difficult to suitably perform the shift-down of the automatic transmission if the vehicle operator depresses the accelerator pedal during the traction control process. If the vehicle operator continues to depress the accelerator pedal, the shift-down of the automatic transmission may abruptly take place when the shifting control process in accordance with the throttle position of the sub-throttle valve ends. Accordingly, there is a problem in that the shifting control process performed by the above mentioned conventional device cannot correctly reflect the position of the accelerator pedal set by the vehicle operator when the traction control process is being performed.

SUMMARY OF THE INVENTION

Accordingly, it is a general object of the present invention to provide an improved shifting control apparatus in which the above described problems are eliminated.

Another, more specific object of the present invention is to provide a shifting control apparatus for an automatic transmission of an automotive vehicle in which a shifting control process for the automatic transmission during the traction control process is carried out in accordance with an appropriate throttle position derived from the actual throttle position of the sub-throttle valve and the throttle position of the main throttle valve, thus making the shifting operation of the automatic transmission sensitive to the displacement of the accelerator pedal set by the vehicle operator. The above mentioned object of the present invention is achieved by a shifting control apparatus for an automatic transmission of an automotive vehicle, which includes a throttle valve part, a traction control part for carrying out a traction control process for adjusting the throttle valve part to a first throttle position value when the vehicle is operating under prescribed operating conditions, the first throttle position value being smaller (or more closed) than a second throttle position value corresponding to the displacement of an accelerator pedal set by a vehicle operator, a throttle position setting part for setting a mean throttle position value by taking a weighted average of the first throttle position value set while the traction control process is being carried out and the second throttle position value corresponding to the displacement of the accelerator pedal, and a control part for carrying out a shifting control process for the automatic transmission in accordance with the mean throttle position value from the throttle position setting part.

In the shifting control apparatus according to the present invention, the shifting control process performed while the traction control process is being performed is carried out in accordance with the mean throttle position derived from the actual sub-throttle position and the main throttle position, thus making the shifting operation of the automatic transmission sensitive to the displacement of the accelerator pedal set by the vehicle operator. It is possible to prevent the slipping of the driving wheels from occurring due to the displacement of the accelerator pedal set by the vehicle operator when the vehicle is running on a road with a low adhesion factor, thus increasing the vehicle straight line stability.

Other objects and further features of the present invention will become more apparent from the following detailed description when read in conjunction with the accompanying drawings.

DESCRIPTION OF THE PREFERRED EMBODIMENT

A description will be given of the construction of a shifting control apparatus for an automatic transmission of an automotive vehicle according to the present invention, with reference to FIG. 1.

Figure 1:
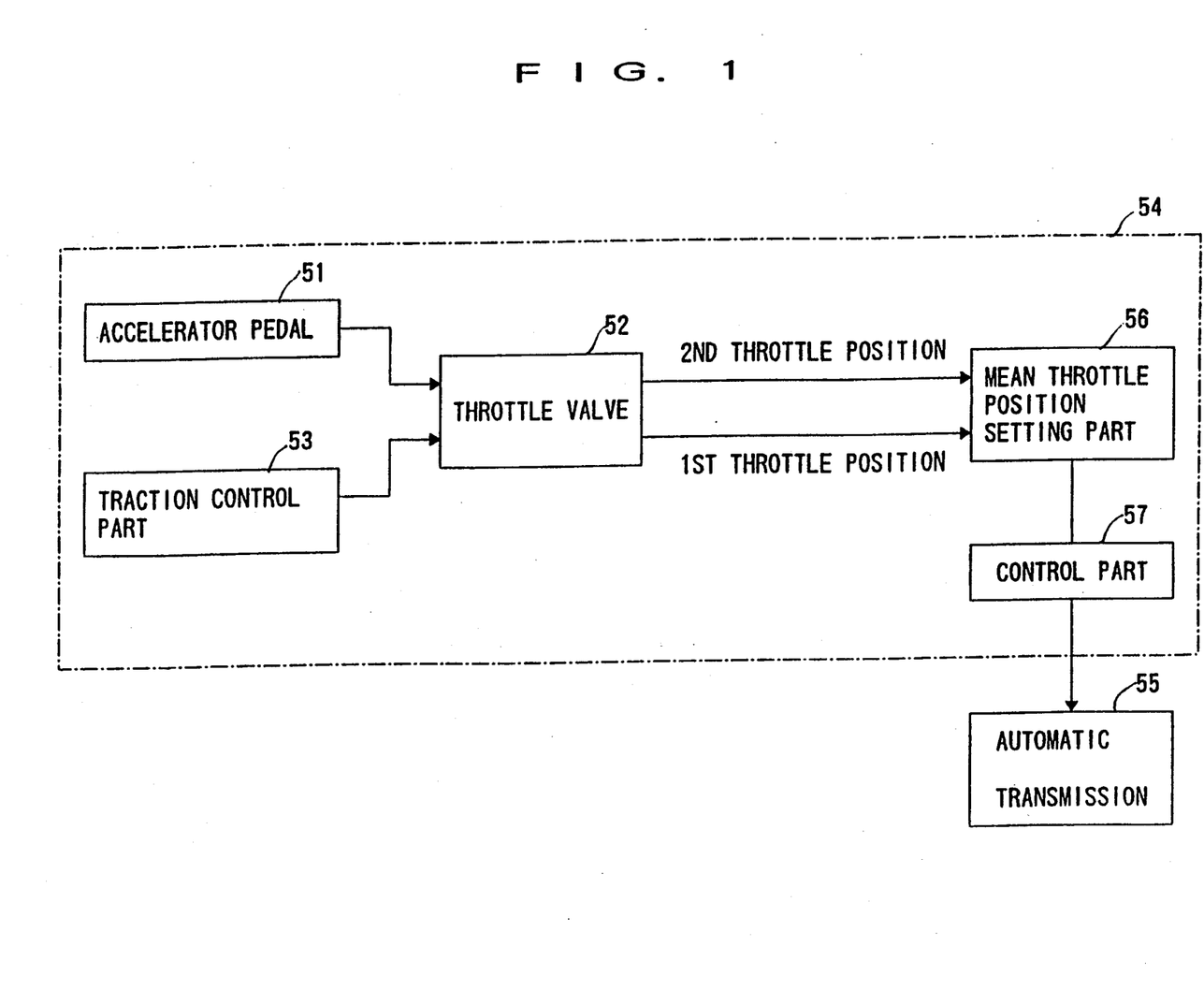
FIG. 1 is a block diagram showing a shifting control apparatus according to the present invention.
Figure 2:
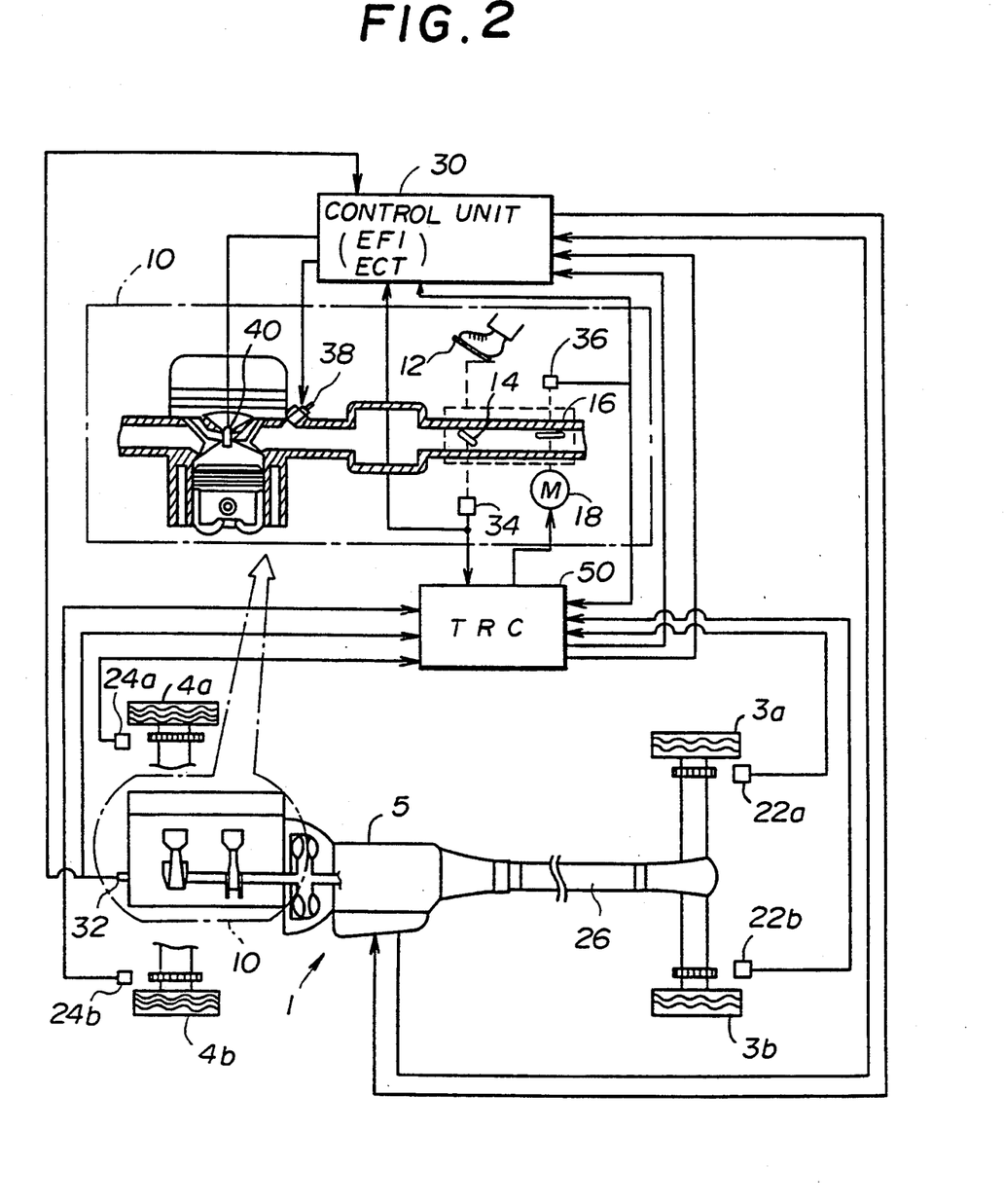
FIG. 2 is a diagram showing an automotive vehicle with an automatic transmission to which an embodiment of the shifting control apparatus according to the present invention is applied.

FIG. 1 shows a shifting control apparatus according to the present invention for controlling an automatic transmission of an automotive vehicle. This shifting control apparatus is provided in an internal combustion engine 54 coupled to an automatic transmission 55. In the shifting control apparatus shown in FIG. 1, a throttle valve part 52, a traction control part 53, a mean throttle position setting part 56, and a control part 57 are provided. The traction control part 53 carries out a traction control process for adjusting the throttle valve part 52 to a first throttle position value when the engine 54 is operating in prescribed operating conditions, the first throttle position value being smaller (or more closed) than a second throttle position value corresponding to a displacement of an accelerator pedal 51 set by a vehicle operator. The mean throttle position setting part 56 sets a mean throttle position value by taking a weighted average of the first throttle position value and the second throttle position value. The control part 57 carries out a shifting control process for the automatic transmission 55 in accordance with the mean throttle position value set by the mean throttle position setting part 56. In the shifting control apparatus described above, even when the traction control process is carried out by the traction control part 53, the shifting operation of the automatic As shown in FIG. 2, an engine speed sensor 32 mounted on the engine 10 to sense the rotational speed of the engine 10 outputs a signal indicating the rotational speed of the engine 10 (revolutions per minute, or r.p.m.). A main throttle position sensor 34 is mounted to sense the throttle position of the main throttle valve 14 and outputs a signal indicating the throttle position of the main throttle valve 14. A sub-throttle position sensor 36 is mounted to sense the throttle position of the sub-throttle valve 16 and outputs a signal indicating the throttle position of the sub-throttle valve 16.

In the engine 10 shown in FIG. 2, a control unit 30 including an electronic fuel injection control unit (EFI unit) and an electronically controlled transmission unit (ECT unit) is provided. The EFI unit of the control unit 30 uses a digital computer to carry out a fuel injection control process for a fuel injection valve 38 of the engine 10 and to carry out an ignition timing control process for a spark plug 40 of the engine 10. The ECT unit of the control unit 30 uses a digital computer to control the shift state of the automatic transmission 5 in accordance with the throttle position signal from the main throttle position sensor 36 and a vehicle speed signal from a vehicle speed sensor (not shown). By the control operation of the ECT unit, the shift state of the automatic transmission 5 is controlled so as to be appropriate for the current vehicle running conditions.

The engine speed signal from the engine speed sensor 32, the throttle position signal from the main throttle position sensor 34, the throttle position signal from the sub-throttle position sensor 36, and other detection signals from other sensors are input to the control unit 30. The EFI unit of the control unit 30 is connected to the fuel injection valves 38 and to the spark plugs 40 of the engine 10. The EFI unit controls the fuel injection and the ignition timing in response to the input signals coming from the sensors described above, and outputs control signals, respectively, to the fuel injection valves 40 and to the spark plugs 38 in accordance with the results of the above mentioned control processes.

In the vehicle 1 shown in FIG. 2, a traction control unit (TRC unit) 50 is provided. The TRC unit 50 uses a digital computer to perform the traction control process for the vehicle 1 equipped with the automatic transmission 5. The rotational speed signals of the four wheels 3a, 3b, 4a and 4b from the wheel speed sensors 22a, 22b, 24a and 24b, the engine speed signal from the engine speed sensor 32, and the throttle position signals of the main and sub-throttle valves 14 and 16 from the throttle position sensors 34 and 36 are input to the TRC unit 50. The TRC unit 50 carries out a traction control process in response to these input signals from the sensors mentioned above. Also, the TRC unit 50 carries out a throttle position control process to control the throttle position of the sub-throttle valve 16 by adjusting the stepper motor 18. The TRC unit 50 is connected to the control unit 30 so that a signal indicating the ON/OFF state of a traction control start flag FS, a fuel cut signal, and an ignition timing retard signal are output by the TRC unit 50 to the control unit 30.

In the case of the TRC unit 50 of the vehicle shown in FIG. 2, the drive torque of the engine 10 during the traction control process is controlled by setting the throttle position of the sub-throttle valve 16 to an appropriate position in accordance with the slipping conditions of the driving wheels. In the above described vehicle shown in FIG. 2, the throttle position Ts of the sub-throttle valve 16 is set by the TRC unit 50 in accordance with the slipping amount dV of the driving wheels 3a and 3b, as follows.

$$Ts(n) = Ts(n-1) + (dTs/dt) \, To \qquad (1)$$

$$(dTs/dt) = K1 \, dV + K2 \, K3 \, dG \qquad (2)$$

In the formula (1) above: "Ts(n)" denotes the position of the sub-throttle valve 16 to be currently set; "Ts(n−1)" denotes the previously set position of the sub-throttle valve 16; and "To" denotes the time period for which the throttle position setting is performed. In the formula (2) above: K1, K2 and K3 are coefficients having positive values; "dV" is the speed difference (dV=Vs−Vd) between the target driving wheel speed Vs (which is determined based on the vehicle speed Vr) and the actual driving wheel speed Vd; and "dG" is the difference (the absolute value) between the rate of change of vehicle speed Vr and the rate of change of driving wheel speed Vd [i.e., dG=(dVr/dt)−(dVd/dt)].

Next, a description will be given of a traction control process performed by the TRC unit 50 of the vehicle shown in FIG. 2.

Figure 3A:
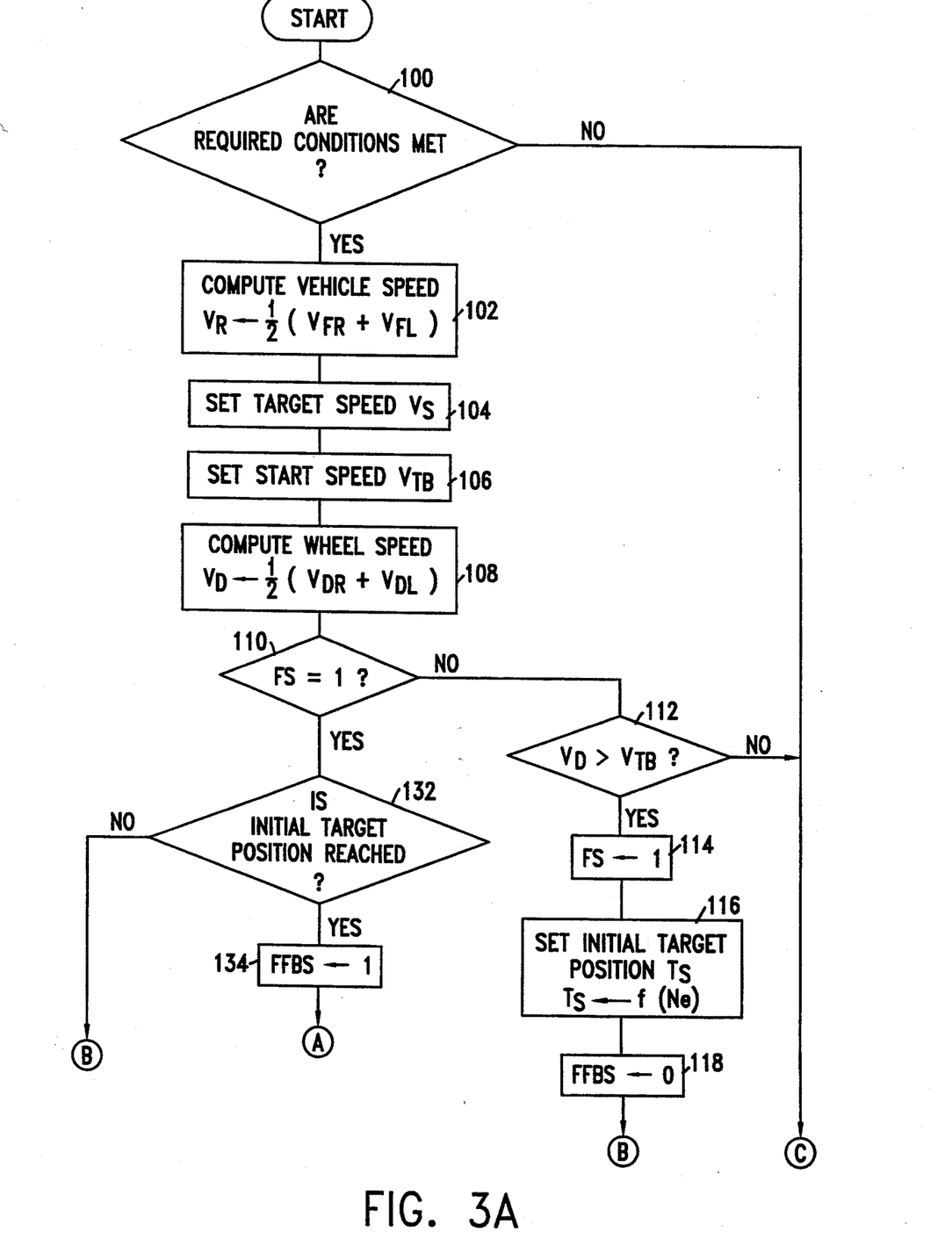
FIGS. 3A and 3B are flow charts for explaining a traction control process performed by a traction control unit of the vehicle shown in FIG. 2.
Figure 3B:
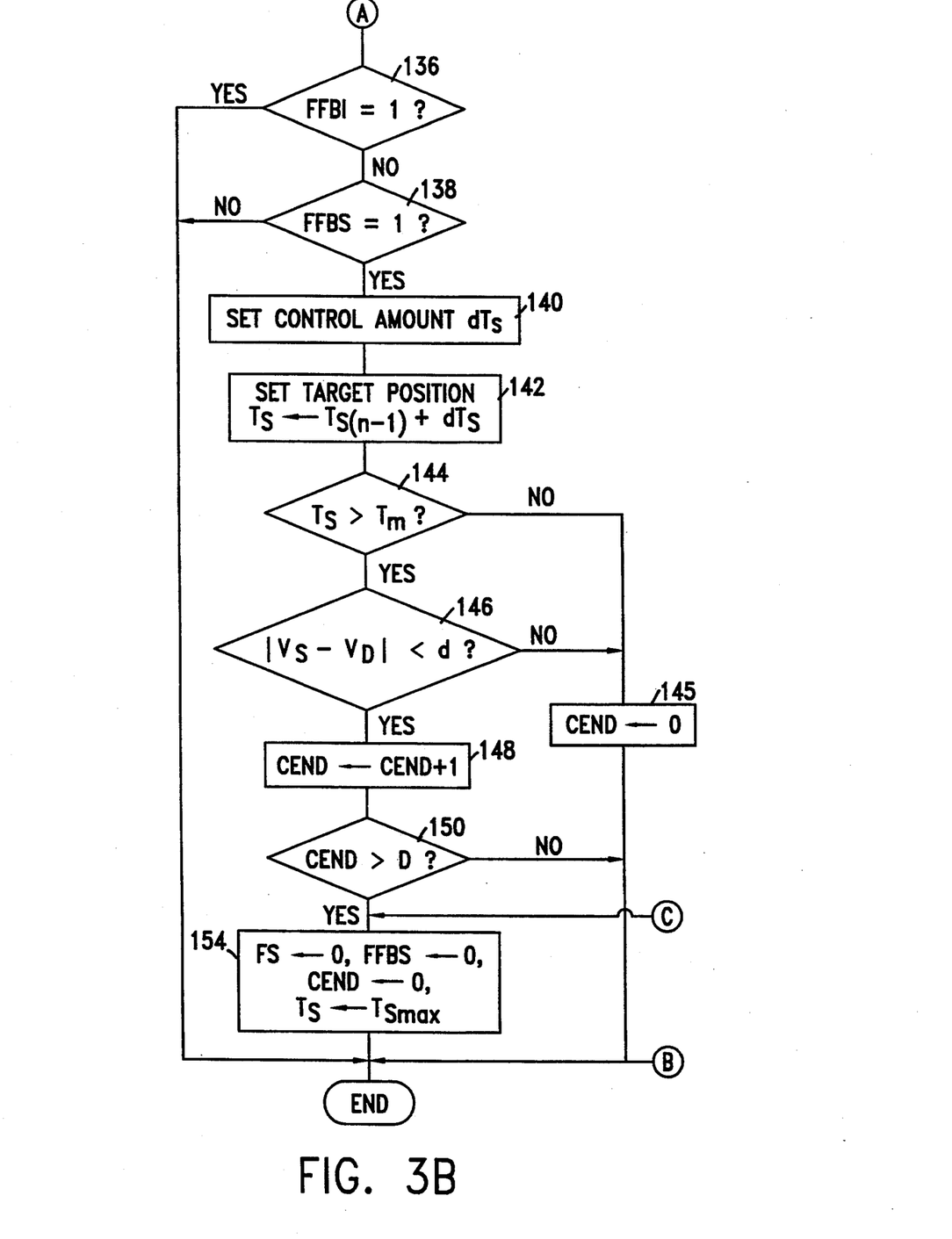

FIGS. 3A and 3B show a traction control process performed by the TRC unit 50 described above. This process is periodically performed at prescribed time intervals (e.g., every 12 msec). Step 100 shown in FIG. 3A detects whether or not the conditions required for starting the traction control process are satisfied. The required conditions include: 1) the throttle position Tm of the main throttle valve 14 is not at the completely closed position, and 2) no malfunction occurs in any of the above mentioned sensors. If either of the two conditions is not satisfied, the next step 154 in FIG. 3B is performed and the basic transmission achieved by the control unit 57 reflects the displacement of the accelerator pedal 51 set by the vehicle operator with a reasonable sensitivity.

Next, a description will be given, with reference to FIG. 2, of an automotive vehicle equipped with an automatic transmission to which an embodiment of the shifting control apparatus according to the present invention is applied. FIG. 2 shows an automotive vehicle 1 which includes an internal combustion engine 10, an automatic transmission 5, a drive shaft 26, driving wheels 3a and 3b, and driven wheels 4a and 4b. The driving wheels 3a and 3b are rotated by a driving force transmitted from the engine 1 to the driving wheels 3a and 3b via the drive shaft 26 and the automatic transmission 5. A set of vehicle speed sensors 22a and 22b is provided at the driving wheels 3a and 3b so as to sense the rotational speed of each of the wheels 3a and 3b, and a set of vehicle speed sensors 24a and 24b is provided at the driven wheels 4a and 4b so as to sense the rotational speed of each of the wheels 4a and 4b.

In an intake passage of the engine 10 shown in FIG. 2, a main throttle valve 14 and a sub-throttle valve 16 upstream from the main throttle valve 14 are provided. External air enters the intake passage in a direction from the right-hand portion to the left-hand portion. The main throttle valve 14 controls the flow of air in the intake passage of the engine 10 since the throttle position of the main throttle valve 14 is adjusted in response to the position of an accelerator pedal 12 set by a vehicle operator. Independently from the operation of the main throttle valve 14, the throttle position of the sub-throttle valve 16 is adjusted by a throttle valve actuator such as a stepper motor 18. traction control process ends. In step 154, all the flags are reset to zero and the throttle position Ts of the sub-throttle valve 16 is set to a maximum throttle position Tsmax, which is the fully open position of the sub-throttle valve 16.

If the required conditions in step 100 are satisfied, the reading of speed parameters from the sensors and the associated calculations are performed in steps 102–108. Step 102 computes a vehicle speed Vr by taking the average of wheel speeds Vfr and Vfl of the right-hand and left-hand driven wheels 4a and 4b from the output signals of the sensors 24a and 24b. Step 104 sets a target speed Vs of the driving wheels 3a and 3b by using the vehicle speed Vr in step 102.

The target speed Vs of the driving wheels is set in step 104 as follows.

1) If Vr≦30 Km/h, Vs=(Vr+2.4) Km/h.
2) If 30 Km/h<Vr≦100 Km/h, Vs=(1.08 Vr) Km/h.
3) If Vr>100 Km/h, Vs is set to the smaller one of (1.08 Vr) Km/h and (Vr+10) Km/h. The target speed Vs is set in step 104, such that the target speed Vs is always greater than the vehicle speed Vr, and that the driving wheels have a desired slipping amount. It is readily understood from the above formulas that when the vehicle speed Vr is low the value of the target slipping ratio (Vs−Vr)/Vr is relatively large ensuring increased vehicle acceleration, and that when the vehicle speed Vr is high the value of the target slipping ratio is relatively small ensuring increased straight line stability of the vehicle.

Step 106 sets a start speed Vtb at which the performing of the traction control process is started. The start speed Vtb set in step 106 is represented by the formula: Vtb=Vs+C, where C is a constant. For the sake of simplicity, the constant C is preset to a value between 2.0 Km/h and 4.0 Km/h depending on the vehicle speed and the road conditions. In other words, the start speed Vtb is set to a value greater than the target speed Vs by the value of the constant C, in order to prevent the traction control process from being performed too frequently. Step 108 computes a driving wheel speed Vd by taking the average of the wheel speeds Vdr and Vdl of the right-hand and left-hand driving wheels from the output signals of the sensors 22a and 22b.

After the reading of the speed parameters and the associated calculations are performed, step 110 detects whether or not a traction control start flag FS is equal to 1. If the traction control start flag FS=0, it is judged that the traction control process has not yet been started. If the traction control start flag FS=1, it is judged that the traction control process has been started.

When the flag FS is not equal to 1, the next step 112 is performed. In step 112, it is judged whether or not it is necessary to start the traction control process. More specifically, step 112 detects whether or not the driving wheel speed Vd is greater than the traction control start speed Vtb. If Vd≦Vtb, it is judged that it is not necessary to start the traction control process, and the next step 154 is performed and the traction control process ends. As described above, in step 154, all the flags are reset to zero and the position Ts of the sub-throttle valve 16 is set to the maximum opening position Tsmax.

If Vd>Vtb in step 112, it is judged that it is necessary to start the traction control process. Step 114 sets the traction control start flag FS to 1. Step 116 sets the position Ts of the sub-throttle valve 16 to an initial target position f(Ne). Step 118 resets an initial feedback control prohibition flag FFBS to zero, and the traction control process ends. The initial target position f(Ne) of the sub-throttle valve 16 is a value determined depending on the engine speed Ne and the road condition. Usually, when the traction control process is not performed, the sub-throttle valve 16 is set at the fully open position, and if the feedback control process is started at this condition it takes a certain time until the sensitivity to a change of the position of the sub-throttle valve 16 appears. In order to eliminate this time, in step 116 the position Ts of the sub-throttle valve 16 is set to the initial target position f(Ne). The initial feedback control prohibition flag FFBS is set to 1 when a prescribed requirement is satisfied after the traction control process is started.

If the above steps 112–118 were performed in a previous cycle, step 110 detects that the flag FS is equal to 1. The next step 132 is performed. In step 132, it is detected whether or not the position Ts of the sub-throttle valve 16 indicated by the output signal of the sub-throttle position sensor 36 has reached the initial target position f(Ne). If the initial target position f(Ne) has not been reached, the traction control process ends. If the initial target position f(Ne) has been reached, the next step 134 is performed. Step 134 sets the initial feedback control prohibition flag FFBS to 1.

Step 136, shown in FIG. 3B, detects whether or not a feedback prohibition flag FFBI is equal to 1. If the flag FFBI is equal to 1, the traction control process ends. If the flag FFBI is not equal to 1, the feedback control process for setting the target position Ts of the sub-throttle valve 16 is performed in steps 138–154.

Step 138 detects whether or not the flag FFBS is equal to 1. If the flag FFBS is not equal to 1, the traction control process ends without performing steps 140–154. If the flag FFBS is equal to 1, the feedback control process for setting the position Ts of the sub-throttle valve 16 is performed in steps 140–154. In step 140, a shift-up control value dTs for obtaining the target position Ts of the sub-throttle valve 16 is determined.

Step 142 sets the target position Ts of the sub-throttle valve 16 based on the previous position Ts(n−1) of the sub-throttle valve 16 and the control value dTs, according to the formula: Ts=Ts(n−1)+dTs. A signal indicating the target position Ts in step 142 is output to the stepper motor 18 for driving the sub-throttle valve 16 shown in FIG. 2.

The traction control process is finished when the following conditions continue for more than a prescribed time period: (1) the position Ts of the sub-throttle valve 16 is greater than the position Tm of the main throttle valve 14, and (2) the absolute value of the slipping amount (Vs−Vd) is less than a prescribed value. In steps 144–154, the above-mentioned conditions are checked for.

Step 144 detects whether or not the position Ts of the sub-throttle valve 16 is greater than the position Tm of the main throttle valve 14. Step 146 detects whether or not the absolute value of the slipping amount (Vs−Vd) is less than a prescribed value "d". If either of the conditions in steps 144 and 146 is not satisfied, step 145 reset a time count CEND to zero, and the traction control process ends. If both the conditions in steps 144 and 146 are satisfied, step 148 increments the time count CEND. Step 150 detects whether or not the time count CEND is greater than a prescribed time D. If the time count CEND is greater than the prescribed time D in step 150, it is judged that the traction control end conditions are satisfied. The prescribed value d and the prescribed time D are suitably preset according to the type of the vehicle to which the traction control apparatus according to the present invention is applied. In step 154, all the flags FS, FFBS, CEND, and FFBI are reset to zero, and the target position Ts of the sub-throttle valve 16 is set to the maximum open position Tsmax. Then, the traction control process ends.

Next, a description will be given of a mean throttle position setting process performed by the EFI unit of the control unit 30 of the vehicle shown in FIG. 2.

Figure 5:
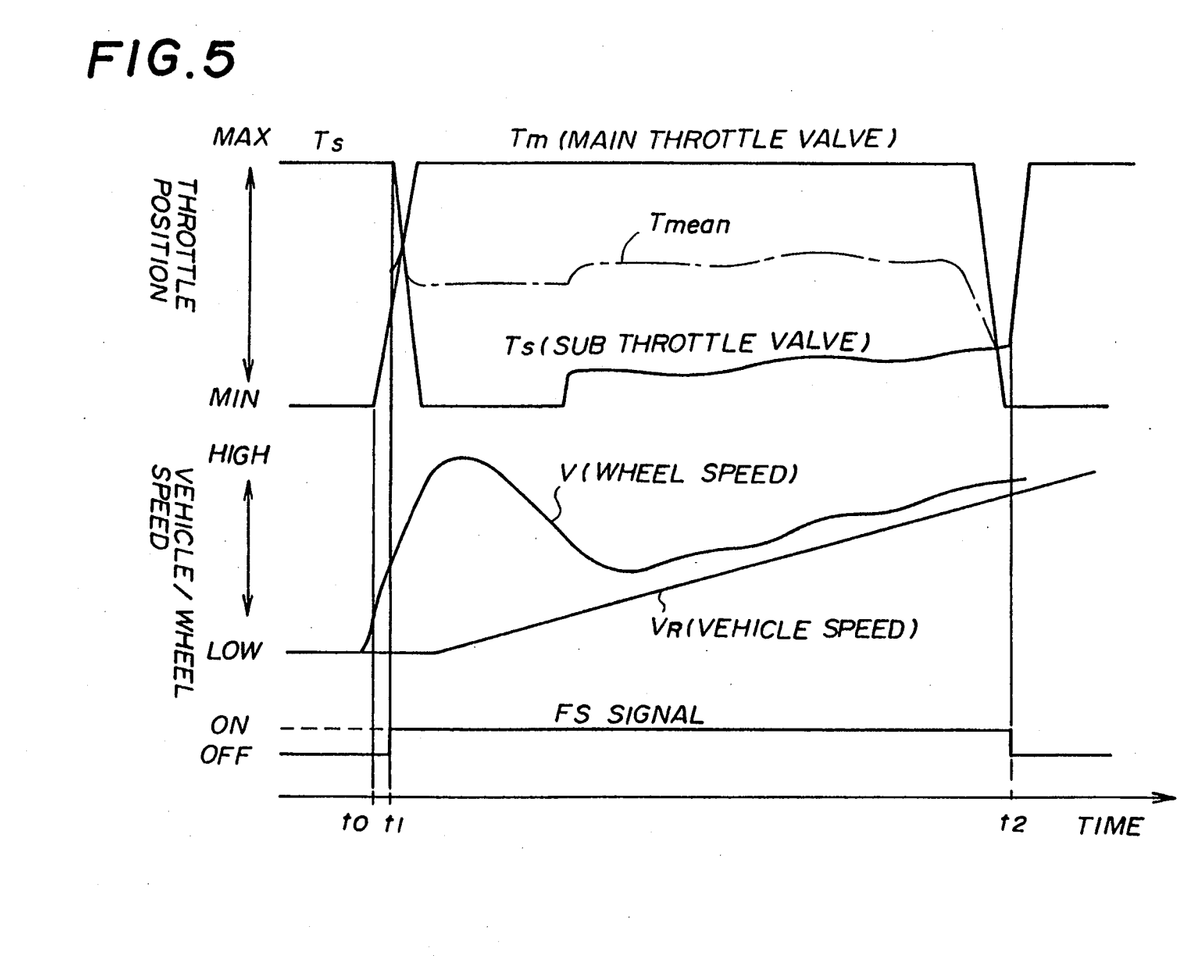
FIG. 5 is a time chart for explaining a shifting control process performed by the shifting control apparatus in accordance with the mean throttle position.

FIG. 5 shows a mean throttle position setting process performed by the shifting control apparatus according to the present invention. As described above, the engine speed signal from the engine speed sensor 32, the throttle position signal (Tm) from the main throttle position sensor 34, the throttle position signal (Ts) from the sub-throttle position sensor 36, and other detection signals from other sensors are input to the EFI unit of the control unit 30, and the EFI unit controls the fuel injection of the fuel injection valves 38 and the ignition timing of the spark plugs 40 in accordance with these input signals. In the ECT unit of the control unit 30, the shift state of the automatic transmission 5 is controlled in accordance with a throttle position signal (Tect) of the main throttle position sensor 36 and in accordance with the vehicle speed signal from the vehicle speed sensor (not shown), so that the shift state becomes appropriate for the vehicle running conditions.

In order to perform the shifting control process for the automatic transmission 5, it is necessary to set an appropriate throttle position (Tect) for the shifting control process in accordance with the throttle position signals output by the main and sub-throttle position sensors 34 and 36. The mean throttle position setting process shown in FIG. 4 is performed to determine this throttle position (Tect) and supply it to the ECT unit.

Figure 4:
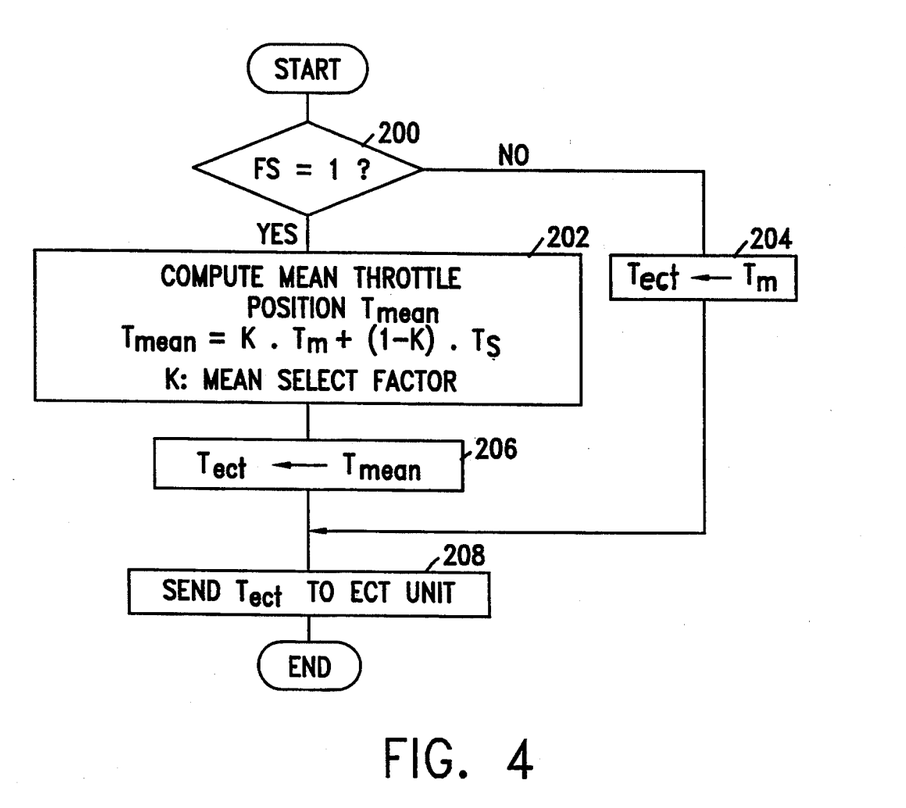
FIG. 4 is a flow chart for explaining a mean throttle position setting process performed by the shifting control apparatus according to the present invention.

The mean throttle position setting process shown in FIG. 4 is performed by the EFI unit of the control unit 30 in synchronism with the traction control process shown in FIGS. 3A and 3B, and it is periodically performed at prescribed time intervals (e.g., every 12 msec). Step 200 shown in FIG. 4 detects whether or not the traction control process is currently being performed. The detection of step 200 is made by checking the value of the FS flag indicated by an FS signal sent from the TRC unit 50. If it is detected that the traction control process is not being performed (i.e., the FS flag is equal to 0), the next step 204 is performed. In step 204, the throttle position (Tmean) used for the shifting control process is set to the throttle position (Tm) of the main throttle valve 14 from the main throttle position sensor 34.

If step 200 detects that the traction control process is currently being performed (i.e., the FS flag is equal to 1), the next step 202 is performed. In step 202, the mean throttle position (Tmean) according to the present invention is determined by taking a weighted average of the main throttle position Tm and the sub-throttle position Ts, as follows.

$$Tmean = K\, Tm + (1 - K)Ts \qquad (3)$$

In the formula (3), "K" is a predetermined mean select factor. The mean throttle position Tmean according to the formula (3) is equal to the weighted average of the main t0, the accelerator pedal 12 is depressed by the vehicle operator to the maximum position, such that the main throttle valve 14 is set to the fully open position.

As shown in FIG. 5, the accelerator pedal 12 is depressed at the time t0, and the main throttle valve 14 is set to the maximum throttle position. Because the traction control process is being performed for a time period between the time t1 and the time t2, the closing process for the sub-throttle valve 16 is performed so that the throttle position of the sub-throttle valve 16 becomes increasingly greater in response to the slipping of the vehicle through the feedback control process.

As shown in FIG. 4, the mean throttle position setting process performed by the EFI unit of the control unit 30 is started when the traction control process is started, and the mean throttle position setting process ends when the traction control process ends. For the time period from the time t1 to the time t2 in the time chart shown in FIG. 5, the mean throttle position Tmean determined through the mean throttle position setting process is supplied to the ECT unit of the control unit 30 as the throttle position Tect for the shifting control process. The mean throttle position Tmean is indicated by a dotted chain line shown in FIG. 5, and it is an intermediate throttle position between the main throttle position Tm and the sub-throttle position Ts. In the ECT unit, the shifting control process for the automatic transmission is carried out in accordance with the mean throttle position Tmean.

When the vehicle is running on a road with an intermediate adhesion factor (e.g., a snow road), the sub-throttle valve 16 is set to a relatively great throttle position through the traction control process. The mean throttle position Tmean according to the above formula (3) is greater than the minimum throttle position of the sub-throttle valve 16. If the vehicle operator depresses the accelerator pedal 12, it is possible that a kick down occurs in the automatic transmission 5. Thus, the shifting operation of the automatic transmission 5 becomes sensitive to the displacement of the accelerator pedal 12 set by the vehicle operator.

When the vehicle is running on a road with a very low adhesion factor (e.g., an iced road), the sub-throttle valve 16 is set to the minimum throttle position through the traction control process. If the vehicle operator depresses the accelerator pedal 12, it is desirable to prevent the kick down in the automatic transmission 5 from occurring under such road conditions. In the above described embodiment, the shifting control process is carried out in accordance with the mean throttle position which is the weighted average of the main and sub-throttle positions Tm and Ts. Thus, even when the sub-throttle valve 16 is set to the minimum throttle position and the main throttle valve 14 is set to the maximum throttle position, it is possible to prevent the occurrence of the kick down in the automatic transmission under such road conditions by presetting the mean select factor K to an appropriate value. It is possible to prevent the slipping of the vehicle due to the increase of the drive torque when the kick down has occurred, and the vehicle straight line stability when the vehicle is running on a low-adhesion factor road is increased.

Generally when the accelerator pedal 12 is depressed by the vehicle operator during the vehicle running condition, a kick down of the automatic transmission occurs. The slipping of the driving wheels occurs due to the kick down of the automatic transmission. When a certain slipping amount is sensed, the traction control process is started. In the shifting control apparatus of the present invention, the shifting control process for the automatic transmission is carried out in accordance with the mean throttle position Tmean. The mean throttle position Tmean is determined by taking the weighted average of the main and sub-throttle positions Tm and Ts. The mean throttle position Tmean determined during the traction control process is always greater than the sub-throttle position Ts set during the traction control process. Therefore, it is very likely that a higher shift position of the automatic transmission is selected by the ECT unit in accordance with the mean throttle position Tmean during the traction control process in comparison with the shift position of the automatic transmission selected by the conventional device in accordance with the sub-throttle position Ts. After the higher shift position of the automatic transmission is selected, the traction control process is performed so that the drive torque of the engine is reduced. Thus, it is possible for the present invention to ensure increased vehicle straight line stability during the running condition of the vehicle.

In the vehicle shown in FIG. 2, the two wheel speed sensors 22a and 22b are provided at the driving wheels 3a and 3b so as to output the wheel speed signals to the TRC unit 50. However, according to the present invention, it is possible that one rotational speed sensor is mounted on the drive shaft 26 instead of the two wheel speed sensors 22a and 22b.

In the above described embodiment, the shifting control apparatus of the present invention is applied to the engine 10 including the main throttle valve 14 and the and sub-throttle positions Tm and Ts, and the weighted average varies depending on the value of the mean select factor K. For example, when the mean select factor K is preset to 50%, the mean throttle position Tmean according to the formula (3) is equal to the average of the throttle positions Tm and Ts. By presetting the mean select factor K to an appropriate value, it is possible to determine the mean throttle position Tmean in which the main and sub-throttle positions Tm and Ts are appropriately allocated.

The mean throttle position Tmean set in step 202 correctly reflects the throttle position of the main throttle position Tm corresponding to the position of the accelerator pedal set by the vehicle operator when the traction control process is being performed.

After the mean throttle position Tmean is determined in step 202, step 206 sets the throttle position Tect for the shifting control process to the value of the mean throttle position Tmean determined in step 202. After step 206 is performed, or after step 204 is performed, step 208 transmits the throttle position Tect for the shifting control process from the EFI unit of the control unit 30 to the ECT unit thereof. In the ECT unit of the control unit 30, the shifting control process for the automatic transmission 5 is carried out in accordance with the throttle position Tect (having the value of the mean throttle position Tmean) received from the EFI unit.

FIG. 5 shows an example of the shifting control process for the automatic transmission performed by the ECT unit of the control unit 30. In this shifting control process shown in FIG. 5, the traction control unit 50 starts performing the traction control process at a time t1, and the traction control process ends at a time t2. At a time sub-throttle valve 16. However, the shifting control apparatus of the present invention can be easily applied to an engine including only one throttle valve in which the traction control process is performed with the throttle valve. In the shifting control apparatus mentioned above, it is necessary to replace the main throttle position and the sub-throttle position (in the above described embodiment) by the accelerator pedal displacement and the throttle position respectively.

Further, the present invention is not limited to the above described embodiment, and variations and modifications may be made without departing from the scope of the present invention.

What is claimed is:

1. A shifting control apparatus for an automatic transmission of an automotive vehicle including an accelerator pedal controlled by an operator of the vehicle, said shifting control apparatus comprising:

throttle valve means;

traction control means carrying out a traction control process adjusting said throttle valve means to reach a first throttle position value when the automotive vehicle is operating under prescribed operating conditions, said first throttle position value being smaller than a second throttle position value corresponding to a displacement of the accelerator pedal;

throttle position setting means setting a mean throttle position value by taking a weighted average of the first throttle position value set while the traction control process is being performed and the second throttle position value corresponding to the displacement of the accelerator pedal; and control means carrying out a shifting control process of the automatic transmission in accordance with the mean throttle position value set by said throttle position setting means.

2. A shifting control apparatus according to claim 1, wherein said control means carries out the shifting control process in accordance with the means throttle position value from said throttle position setting means when the traction control process is being performed by said traction control means, and when the traction control process is not being performed by said traction control means, said control means carries out the shifting control process in accordance with the second throttle position value.

3. A shifting control apparatus according to claim 1, wherein said throttle position setting means determines a mean throttle position value Tmean by calculating a weighted average of the first throttle position value Ts and the second throttle position value Tm in accordance with the formula: $Tmean = K\, Tm + (1-K)\, Ts$, where K is a predetermined factor.

4. A shifting control apparatus according to claim 1, further comprising a plurality of wheels and a corresponding plurality of wheel speed sensors coupled to said traction control means, each wheel speed sensor outputting a signal indicative of the wheel speed of a respective wheel to said traction control means, wherein said traction control means comprises a traction control unit provided in the vehicle, said traction control unit outputting a control signal to said throttle valve means in accordance with the wheel speed signals.

5. A shifting control apparatus according to claim 1, wherein said throttle valve means comprises a sub-throttle valve provided in an intake passage of an engine, said sub-throttle valve being adjusted by said traction control means to reach said first throttle position value when the vehicle is operating under the prescribed operating conditions.

6. A shifting control means according to claim 1, wherein the wheels of the engine include at least one driving wheel and one driven wheel and wherein the shifting control apparatus further comprises means for detecting an amount of slipping of the driving wheel, said traction control means controlling the throttle valve means to adjust the throttle position based on the detected amount of slipping of the driving wheel, so that an engine torque is adjusted in accordance with said throttle position.

7. A shifting control apparatus according to claim 1, wherein, during the prescribed operating conditions of the vehicle, said traction control means adjusts the throttle valve means to reach the first throttle position value so as to decrease the engine torque, and wherein, after the throttle valve means has been adjusted to the first throttle position value, said traction control means maintains the throttle valve means at said first throttle position value until a prescribed time has elapsed.

* * * * *

UNITED STATES PATENT AND TRADEMARK OFFICE
CERTIFICATE OF CORRECTION

PATENT NO. : 5,405,302
DATED : April 11, 1995
INVENTOR(S) : Yoshifumi YAGI, et al.

It is certified that error appears in the above-indentified patent and that said Letters Patent is hereby corrected as shown below:

Column 4, line 2, after "automatic" insert everything from Column 5, line 37, beginning with "transmission achieved..." through Column 6, line 2, ending with "motor 18."

Column 5, line 37, should be followed by text in column 6, line 2, beginning with "traction control process ends." and everything that comes thereafter.

Column 7, line 64, change "reset" to --resets--.

Column 9, line 2, after "main" insert from Column 10 everything from line 34, beginning with "and sub-throttle..." through line 68, ending with "At a time".

Column 10, line 33, "and the" should be followed by text in column 10, line 68, begining with "sub-throttle".

UNITED STATES PATENT AND TRADEMARK OFFICE
CERTIFICATE OF CORRECTION

PATENT NO. : 5,405,302
DATED : April 11, 1995
INVENTOR(S) : Yoshifumi YAGI, et al.

It is certified that error appears in the above-indentified patent and that said Letters Patent is hereby corrected as shown below:

Column 11, line 41, change "means" to --mean--.

Signed and Sealed this

Tenth Day of October, 1995

BRUCE LEHMAN

*Attest:*

*Attesting Officer*        *Commissioner of Patents and Trademarks*